United States Patent [19]

Ujihashi et al.

[11] 4,383,408
[45] May 17, 1983

[54] EXHAUST GAS PURIFYING METHOD OF AN INTERNAL COMBUSTION ENGINE

[75] Inventors: Michiaki Ujihashi; Kichiro Kato, both of Susono, Japan

[73] Assignee: Toyota Jidosha Kogyo Kabushiki Kaisha, Aichi, Japan

[21] Appl. No.: 177,607

[22] Filed: Aug. 13, 1980

[30] Foreign Application Priority Data

Aug. 17, 1979 [JP] Japan .................................. 54-104015

[51] Int. Cl.³ .............................................. F01N 3/18
[52] U.S. Cl. ..................................... 60/274; 60/276; 60/277; 60/285; 60/290
[58] Field of Search ................... 60/274, 276, 289, 290, 60/277; 123/440, 489; 60/285

[56] References Cited

U.S. PATENT DOCUMENTS

| | | | |
|---|---|---|---|
| 3,931,710 | 1/1976 | Hartel | 60/276 |
| 3,949,551 | 4/1976 | Eichler | 60/274 |
| 3,962,867 | 6/1976 | Ikeura | 60/276 |
| 3,986,352 | 10/1976 | Casey | 60/276 |
| 4,000,615 | 1/1977 | Bockelmann | 60/277 |
| 4,058,978 | 11/1977 | Bockelmann | 60/277 |
| 4,099,377 | 11/1978 | Yoshimura | 60/289 |
| 4,148,188 | 4/1979 | Tokura | 60/285 |
| 4,149,376 | 4/1979 | Masaki | 60/290 |
| 4,233,811 | 11/1980 | Masaki | 60/274 |
| 4,276,745 | 7/1981 | Takada | 60/289 |

*Primary Examiner*—Douglas Hart
*Attorney, Agent, or Firm*—Parkhurst & Oliff

[57] ABSTRACT

At least one electrical signal which indicates an operating condition of an internal combustion engine is generated, and then a first air-fuel ratio feedback control system which controls a carburetor air-fuel ratio and a second air-fuel ratio feedback control system which controls the amount of secondary air supplied into the exhaust system is selectively energized so as to function in accordance with the generated electrical signal.

2 Claims, 20 Drawing Figures

EXHAUST GAS PURIFYING METHOD OF AN INTERNAL COMBUSTION ENGINE

BACKGROUND OF THE INVENTION

The present invention relates to a method of purifying exhaust gas of an internal combustion engine by using a catalytic converter.

In exhaust gas purifying systems for purifying the gas exhausted from the combustion chambers by providing a catalytic converter in the exhaust systems of internal combustion engines, it is advantageous, from the standpoint of increasing the efficiency of purifying the exhaust gas, to confine the air-fuel ratio of the exhaust gas introduced into the catalytic converter within a predetermined range required by the catalytic converter and, in many cases, to confine the air-fuel ratio within a predetermined range around the stoichiometric air-fuel ratio. According to a conventional exhaust gas purifying system, an air-fuel ratio sensor is installed in the exhaust system to detect the exhaust gas air-fuel ratio in the engine by detecting the concentrations of particular components contained in the exhaust gas, then a carburetor installed in the intake system is controlled, in response to the detected results, in such a manner that the air-fuel ratio of the mixture gas supplied to the combustion chambers approaches the stoichiometric air-fuel ratio. According to another conventional exhaust gas purifying system, the air-fuel ratio of the mixture gas supplied into the combustion chambers is adjusted, in advance, to the rich side with respect to the stoichiometric air-fuel ratio, then, the secondary air is supplied into the gas exhausted from the combustion chambers depending upon the detected results of the air-fuel ratio sensor, in such a manner that the air-fuel ratio of the gas introduced into the catalytic converter lies within a predetermined range.

With the former method, the air-fuel ratio of the gas supplied into the combustion chamber can be controlled within a range around the stoichiometric air-fuel ratio, whereby unburned components exhausted from the combustion chamber are reduced, and thus, the temperature rise of the catalytic converter is restrained. When the engine is running at low speeds or when small loads are exerted on the engine, however, the feedback control for the air-fuel ratio is poor in accuracy, giving rise to the occurrence of variation in the air-fuel ratio and diminishing the operational characteristics of the vehicle. Furthermore, when the air-fuel ratio of the mixture gas supplied to the combustion chambers lies in the vicinity of the stoichiometric air-fuel ratio, the NOx components in the exhaust gas are increased.

With the latter method, on the other hand, the feedback control for the air-fuel ratio is performed in the exhaust system with high precision, which presents an advantage with regard to purifying the emission. Moreover, since the air-fuel ratio of the mixture gas supplied to the combustion chamber is rich in comparison with the stoichiometric air-fuel ratio, emitted NOx components are reduced, and high power output is produced by the engine, contributing to high operational performance of the vehicle. However, unburned components are contained in large amounts in the gas exhausted from the combustion chambers and, thus, the supply of the secondary air in amounts sufficient for the combustion of the unburned components often causes the catalytic converter to be overheated.

SUMMARY OF THE INVENTION

It is, therefore, an object of the present invention to provide an exhaust gas purifying method whereby good purifying efficiency with respect to emissions can be obtained and, also, good operational performance can be obtained without overheating the catalytic converter.

According to the present invention, an exhaust gas purifying method of an internal combustion engine comprises the steps of: generating at least one electrical signal which indicates the operating condition of the engine, and selectively energizing a first or second air-fuel ratio feedback control means so that it executes its feedback control operation in accordance with the generated electrical signal. The first air-fuel ratio feedback control means is so constructed that it controls an air-fuel ratio of the air-fuel mixture supplied into the combustion chambers, in accordance with an electrical signal from an air-fuel ratio sensor which detects the concentration of a predetermined component contained in the exhaust gas. The second air-fuel ratio feedback control means is so constructed that it controls the amount of secondary air supplied into an exhaust passage at a position located upstream of the air-fuel ratio sensor and a catalytic converter, in accordance with the electrical signal from the air-fuel ratio sensor.

It is preferable that the above-mentioned energizing step includes a step of energizing the first air-fuel ratio feedback control means so that it executes its function and deenergizing the second air-fuel ratio feedback control means so as to stop its functioning, when the operating condition of the engine becomes a condition where the temperature of the catalytic converter will exceed a predetermined value.

The above and other related objects and features of the present invention will be apparent from description of the present invention set forth below, with reference to the accompanying drawings, as well as from the appended claims.

DETAILED DESCRIPTION OF THE PREFERRED EMBODIMENTS

Figure 1:
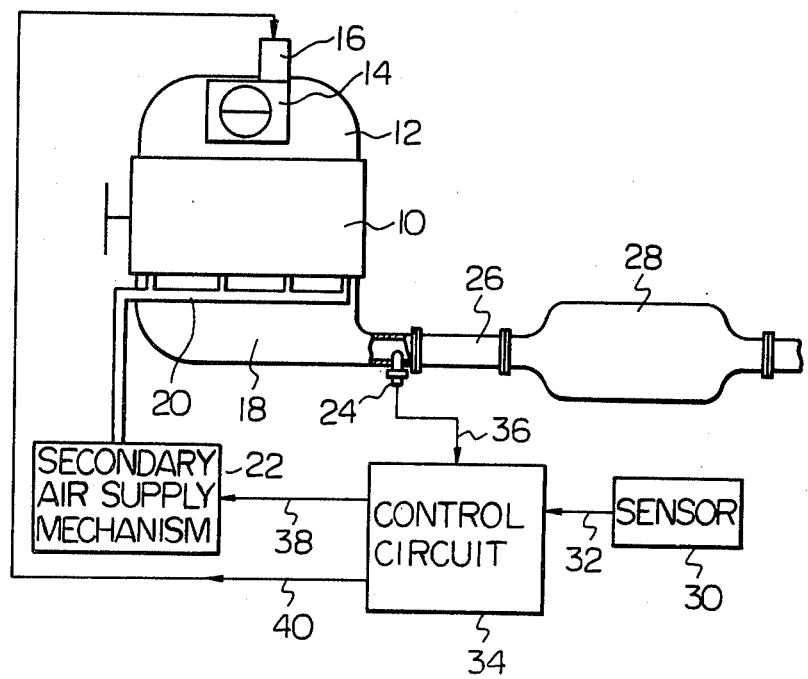
FIG. 1 is a schematic diagram illustrating an embodiment of the present invention.

Referring to FIG. 1, reference numeral 10 denotes an engine body, 12 an intake manifold and 14 a carburetor which is installed in an air intake system upstream of the intake manifold 12. The carburetor 14 has an actuator 16 for adjusting the air-fuel ratio of a mixture gas which is supplied to the combustion chambers (not shown) of the engine 10. In FIG. 1, furthermore, reference numeral 18 denotes an exhaust manifold, 20 a manifold for injecting secondary air into the exhaust manifold 18, 22 a secondary air supply mechanism for adjusting the amount of the secondary air, 24 an air-fuel ratio sensor which is installed in the exhaust system downstream of the manifold 20 for injecting the secondary air and which detects the concentration of a particular component, such as oxygen, in the exhaust gas, 26 an exhaust pipe, and 28 a catalytic converter which is installed in the exhaust pipe 26. The catalytic converter 28 consists of a three-way catalytic converter which is capable of simultaneously purifying three noxious components, i.e., HC, CO and NOx, contained in the exhaust gas. Reference numeral 30 denotes an engine-condition sensor which produces signals to discriminate the operating condition of the engine, i.e., which produces signals indicating the rotational speed of the engine, intake vacuum, vehicle speed, atmospheric pressure, atmospheric temperature, venturi vacuum pressure and shifted position of the manual transmission. Detection signals produced by the sensor 30 are fed to a control circuit 34 via a line 22. Detection signals of the air-fuel ratio sensor 24 are also fed to the control circuit 34 via a line 36. The control circuit 34 discriminates the operating conditions of the engine relying upon the detection signals from the sensor 30. Depending upon the discriminated result, the control circuit 34 feeds instruction signals, via lines 38 and 40, to the adjustment mechanisms. In response to the instruction signal, the feedback control for the air-fuel ratio of the engine based on the detected result from the air-fuel ratio sensor 24 is effected by adjusting the air-fuel ratio of the mixture gas in the carburetor 14 in the intake system (hereinafter referred to as carburetor feedback control), or by adjusting the amount of the secondary air in the exhaust system (hereinafter referred to as secondary air feedback control). In some cases, the engine's air-fuel ratio is controlled by using both the carburetor and secondary air feedback control methods. In such cases, both the first and second feedback control means are energized when the engine is in one operating condition, while only the first feedback control means is energized when the engine is in a second operating condition which would cause the catalytic converter to exceed a predetermined temperature.

Figure 2:
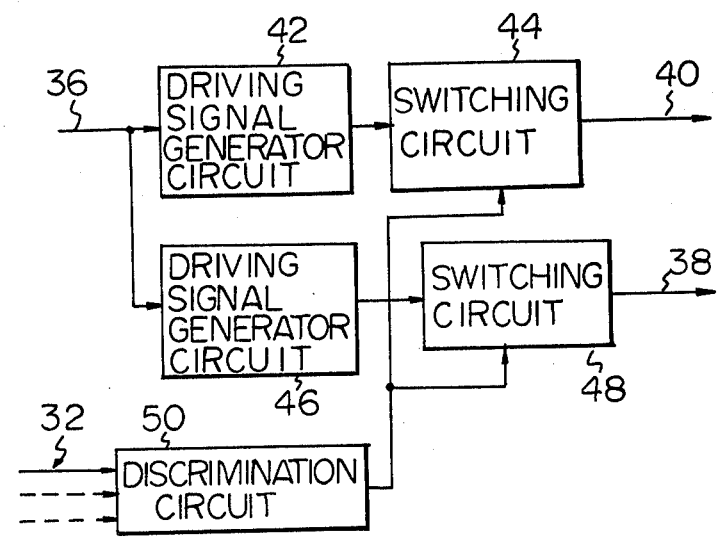
FIG. 2 is a block diagram schematically illustrating the control circuit of FIG. 1.

FIG. 2 is a block diagram schematically illustrating the control circuit of FIG. 1, in which reference numeral 42 denotes a first driving signal generator circuit which generates signals for driving the actuator 16 of the carburetor 14 in response to the detection signals from the air-fuel ratio sensor 24 via the line 36. The generator circuit 42 can be constructed in a variety of ways depending upon the type of the actuator 16. As required, the driving signals from the generator circuit 42 are fed to the actuator 16 via a first switching circuit 44 and the line 40. In FIG. 2, reference numeral 46 denotes a second driving signal generator circuit which generates signals for driving the secondary air supply mechanism 22 in response to the detection signals from the air-fuel ratio sensor 24 via the line 36. The driving signals are fed, as required, to the secondary air supply mechanism 22 via a second switching circuit 48 and the line 38. The generator circuit 46 can also be constructed in a variety of ways depending upon the type of the secondary air supply mechanism 22.

The first and second switching circuits 44 and 48 transmit and interrupt the driving signals in response to a selection signal from a discrimination circuit 50. The discrimination circuit 50 discriminates the operating conditions of the engine depending upon at least one kind of detection signal from the engine-condition sensor 30, and makes the switching circuit 44 when the operating conditions are such that the temperature of the catalytic converter 28 exceeds its upper limit value, so that the driving signals are fed to the actuator 16. In this case, the switching circuit 48 may be made or broken. When the operating conditions of the engine are so discriminated that the temperature of the catalytic converter 28 does not exceed its upper limit value, i.e., when it is so discriminated that the engine is under normal operating conditions, the switching circuit 44 is broken and the switching circuit 48 is made, so that the driving signals are fed to the secondary air supply mechanism 22 only.

An embodiment of the present invention is illustrated below in detail, which embodiment employs an electromagnetic valve of the on-off control type and an air control valve of the type of pneumatic pressure drive for the secondary air supply mechanism 22, employing an electromagnetic valve of the on-off control type for the actuator 16 to adjust the air bleeding amount, and employing a vehicle speed sensor for the engine-condition sensor 30.

Figure 3:
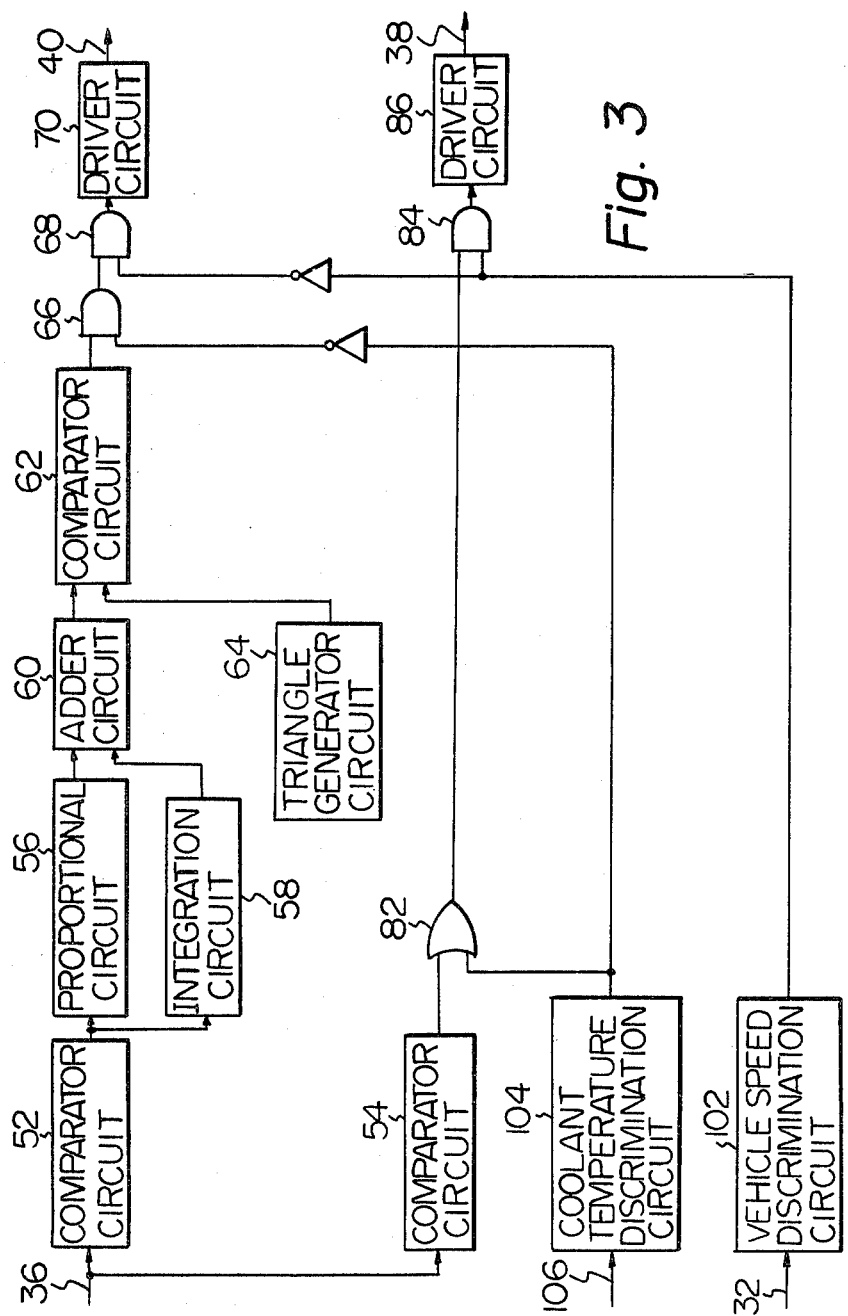
FIG. 3 is a block diagram of an embodiment of the control circuit illustrated in FIG. 1.
Figure 4:
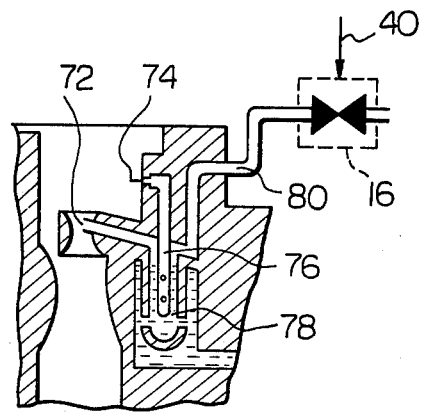
FIG. 4 is a schematic diagram of the carburetor illustrated in FIG. 1.
Figure 5:
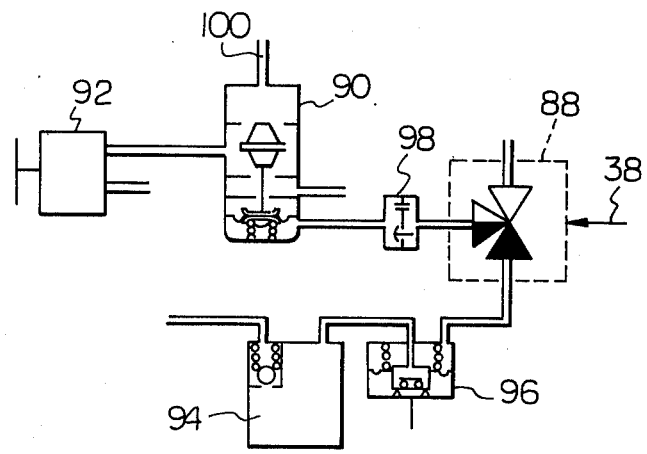
FIG. 5 is a schematic diagram of the secondary air supply mechanism illustrated in FIG. 1.

FIG. 3 is a block diagram of the control circuit 34, FIG. 4 is a diagram schematically illustrating the construction of the carburetor 14 and the actuator 16, and FIG. 5 is a diagram schematically illustrating the construction of the secondary air supply mechanism 22.

In FIG. 3, reference numerals 52 and 54 denote comparator circuits for comparing the voltage level of the detection signals introduced from the air-fuel ratio sensor 24 via the line 36 with a reference voltage. The air-fuel ratio sensor 24 senses the concentrations of particular components, for example, the oxygen concentration, in the exhaust gas to produce detection signals of different levels depending upon whether the air-fuel ratio in the engine is on the rich side or the lean side with respect to the stoichiometric air-fuel ratio. Therefore, by discriminating these levels by these comparator circuits 52 and 54, it is possible to determine whether the air-fuel ratio is on the rich side or the lean side.

The output of the comparator circuit 52 is fed to a proportional circuit 56 and to an integration circuit 58. The outputs of the proportional circuit 56 and the integration circuit 58 are added together through an adder circuit 60. Therefore, the output of the adder circuit 60 possesses a level which is obtained by proportionally integrating the output level of the comparator circuit 52. According to the embodiment of FIG. 3, the comparator circuit 52 produces an output of a high level when the air-fuel ratio in the engine is on the rich side, and produces an output of a low level when the air-fuel ratio in the engine is on the lean side. Therefore, the output level of the adder circuit 60 rapidly increases when the air-fuel ratio is changed from the lean side to the rich side (hereinafter referred to as skipping operation), and then, gradually increases with the lapse of time in which the air-fuel ratio resides on the rich side. Conversely, the output level rapidly decreases (skipping operation) when the air-fuel ratio is changed from the rich side to the lean side, and then, gradually decreases with the lapse of time in which the air-fuel ratio resides on the lean side. A comparator circuit 62 compares the output of the adder circuit 60 with a voltage signal having a triangular wave form from a triangle generator circuit 64. The comparator circuit 62, therefore, produces a voltage signal of rectangular waves having a duty ratio which corresponds to the output level of the adder circuit 60, and the voltage signal of rectangular waves is fed to a driver circuit 70 while AND gates 66 and 68 are opened. Driving signals produced by the driver circuit 70 are then supplied to an actuator 16, illustrated in FIG. 4, via the line 40.

In FIG. 4, reference numeral 72 denotes a main nozzle, 74 a main air jet, 76 an air bleed pipe, 78 a well, and 80 an air path communicated with the well 78. The actuator 16 consisting of an electromagnetic valve of the on-off control type is provided in the air path 80. When the electromagnetic valve 16 is closed in response to the driving signal fed through the line 40, the air path communicated with the well 78 is only a path which is communicated with the main air jet 74, whereby increased vacuum pressure is produced to suck the fuel causing the air-fuel ratio of the mixture gas formed by the carburetor to be increased. When the electromagnetic valve 16 is opened, on the other hand, the air path communicated with the well 78 consists of the air path 80 and a path which is communicated with the main air jet 74, whereby the negative pressure is decreased, the force for sucking the fuel is decreased and, thus, the air-fuel ratio of the mixture gas is decreased. Thus, by opening and closing the actuator 16, consisting of the electromagnetic valve, in response to the driving signals, it is possible to bring the air-fuel ratio of the mixture gas supplied to the combustion chambers of an engine close to a stoichiometric air-fuel ratio.

Referring to FIG. 3, the output of the comparator circuit 54 passes through an OR gate 82. When an AND gate 84 is opened, the output is further fed to a driver circuit 86 where it is converted into a driving signal and is supplied to the secondary air supply mechanism, illustrated in FIG. 5, via the line 38.

In FIG. 5, reference numeral 88 denotes an electromagnetic switching valve, 90 a diaphragm-type air control valve, 92 an air pump, 94 a vacuum reserve tank, 96 a cut-off valve and 98 a vacuum transmission valve. When the driving signal fed through the line 38 is of the high level state, i.e., when the air-fuel ratio for the engine is on the rich side, the electromagnetic switching valve 88 causes a diaphragm chamber of the air control valve 90 to be communicated with the side of the cut-off valve 96. Contrary to this, when the driving signal is of the low level state, i.e., when the air-fuel ratio for the engine is on the lean side, the electromagnetic switching valve 88 so functions that the diaphragm chamber is opened to the open air. Hence, the pressure in the diaphragm chamber of the air control valve 90 is controlled between the atmospheric pressure and the vacuum established by the engine, and the amount of the secondary air introduced from the air pump 92 and sent to the secondary air injection manifold 20 is controlled so as to increase or decrease. The vacuum reserve tank 94 is provided to store the vacuum so that the air control valve 90 can be actuated even when the vacuum in the intake manifold approaches atmospheric pressure under particular operational conditions of the engine, such as during acceleration. The cut-off valve 96 controls the vacuum transmitted to the diaghragm chamber of the air control valve 90 so that the vacuum level in the diaphragm chamber will not exceed a predetermined value; this makes it possible to prevent the control amplitude of the amount of the secondary air from becoming too great. The vacuum transmission valve 98 so functions that the vacuum is gradually transmitted to the diaphragm chamber in the air control valve 90; this makes it possible to prevent the control amplitude of the amount of the secondary air from becoming too great as a result of a sudden transmission of the vacuum.

Figure 13:
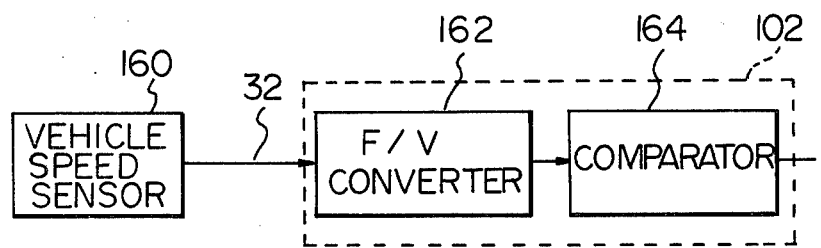
FIGS. 13 through 20 are block diagrams of various sensors and discrimination circuits thereof.

Referring to FIG. 3, AND gates 68 and 84 are opened and closed in response to selection signals from a vehicle speed discrimination circuit 102. As illustrated in FIG. 13, the vehicle speed discrimination circuit 102 comprises: a frequency-voltage (F/V) converter 162, which receives the output of a vehicle speed sensor 160 of a well-known construction and which produces a voltage signal having a voltage proportional to the vehicle speed; and a comparator which produces a selection signal of the high level voltage when it is so discriminated that the vehicle speed is equal to or slower than 45 mph and which produces a selection signal of the low level voltage when it is so discriminated that the vehicle speed is higher than 45 mph. When the vehicle speed is slower than 45 mph, since the AND gate 84 is opened and the AND gate 68 is closed, only the secondary air feedback control is carried out. When the vehicle speed exceeds 45 mph, since the AND gate 84 is closed and the AND gate 68 is opened, only the carburetor feedback control is carried out.

By carrying out the secondary air feedback control at a speed equal to or slower than 45 mph and carrying out the carburetor feedback control at a speed higher than 45 mph, it is possible to prevent the catalytic converter from being overheated while enhancing the engine's operational characteristics. The reasons for this will now be illustrated by using FIG. 6 below.

Figure 6:
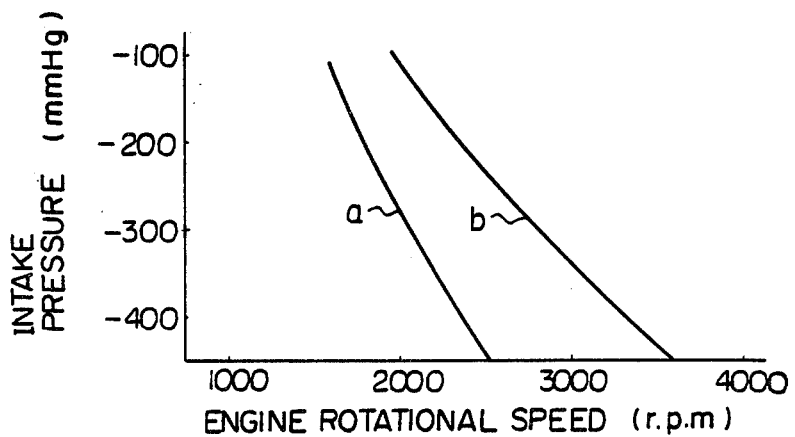
FIG. 6 illustrates upper-limit temperature characteristics of the catalytic converter with respect to the rotational speed and the intake vacuum pressure.

FIG. 6 illustrates examples of allowable upper-limit temperature characteristics of a catalytic converter with respect to the rotational speed of an engine and to the intake vacuum pressure. In FIG. 6, symbol a represents the allowable upper-limit temperature (boundary of overheating) when the secondary air feedback control is carried out and b represents the allowable upper-limit temperature (boundary of overheating) when the carburetor feedback control is carried out. In other words, with the feedback control being carried out, when the operating conditions of the engine lie in the regions on the right sides of the solid lines a and b for extended periods of time, the catalytic converter will be overheated, causing the catalytic converter itself to become defective. Therefore, at a speed of 45 mph, at which the rotational speed of the engine is about 2000 rpm when the gears of the manual transmission are placed in fourth, the secondary air feedback control and the carburetor feedback control should be changed over, to enhance the operational performance at speeds equal to or lower than 45 mph, while preventing the catalytic converter from being overheated when the vehicle speed exceeds 45 mph. In this case, the control is executed in accordance with the vehicle speed when the gears are placed in fourth only. This is because of the fact that during the ordinary running of vehicles, the gears are placed in fourth for the longest period of time, and thus, the overheating of the catalytic converter when the gears are placed in fourth becomes a serious problem.

Reverting to the circuit diagram of FIG. 3, reference numeral 104 denotes a coolant-temperature discrimination circuit which receives, through a line 106, coolant-temperature signals which represent the temperature of the coolant of the engine, and which are sent from a coolant-temperature sensor that is not illustrated. When the temperature of the coolant is smaller than a predetermined value which is set, for example, at 60° C., the coolant-temperature discrimination circuit 104 produces signals of a high level voltage. Therefore, when the temperature of the coolant is below the predetermined value, i.e., when the engine has not been warmed up, the AND gate 66 is closed and signals which are always of the high level are applied to the AND gate 84 via the OR gate 82.

Consequently, if the vehicle speed is equal to or lower than 45 mph, the secondary air is fed in large amounts to the engine, so that the warming up of the catalytic converter is promoted.

In the above-mentioned embodiment, the operating condition is discriminated relying upon the vehicle speed to change over the secondary air feedback control and the carburetor feedback control. According to the method of the present invention, however, the operating condition can be discriminated using the below-mentioned various engine-condition signals in addition to the vehicle speed.

(1) The operating condition may be discriminated depending upon the rotational speed of the engine. Namely, when the rotational speed of the engine is equal to or smaller than 2000 rpm, the secondary air feedback control is carried out, and when the rotational speed is higher than 2000 rpm, the carburetor feedback control is carried out. In other words, the control is switched over at 2000 rpm, which is the boundary of overheating for the catalytic converter as illustrated in FIG. 6.

Figure 14:
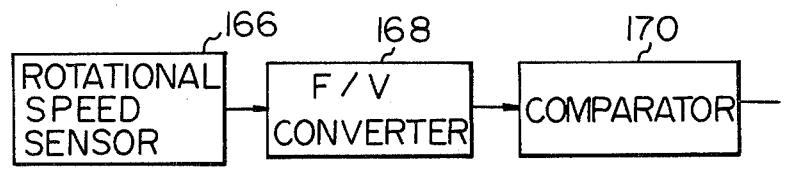

This discrimination of the engine's operating condition can be embodied by circuits illustrated in FIG. 14. These circuits comprise a rotational speed sensor 166, which produces crank pulses having a frequency proportional to the rotational speed; a F/V converter 168; and a comparator 170, which produces a selection signal of a high level voltage when the output voltage from the F/V converter 168 is equal to or lower than a predetermined voltage, corresponding to the rotational speed of 2000 rpm, and produces a low level selection signal when the output from F/V coverter 168 is higher than a predetermined voltage.

(2) The operating condition may be discriminated depending upon both the rotational speed and the intake pressure. That is, when the rotational speed of the engine is equal to or lower than 2000 rpm and the intake pressure is equal to or lower than (i.e., down the ordinate from) −300 mmHg, the secondary air feedback control is carried out. The carburetor feedback control is carried out in other cases. This method also depends upon the boundary characteristics of overheating for the catalytic converter as illustrated in FIG. 6.

Figure 15:
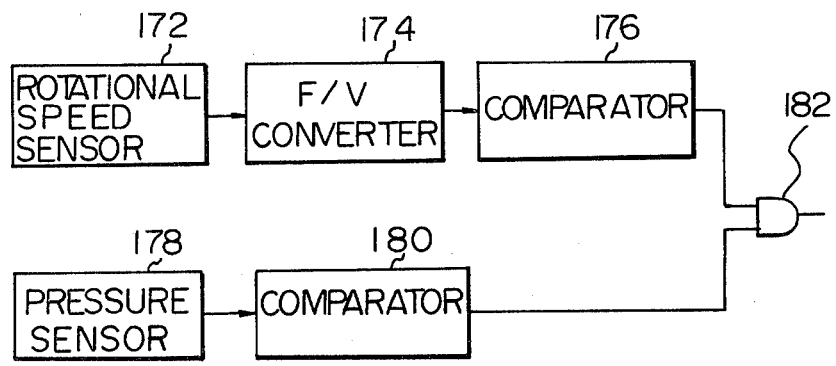

This discrimination of the engine's operating condition can be embodied by circuits illustrated in FIG. 15. In the circuits of FIG. 15, a rotational speed sensor 172, a F/V converter 174 and a comparator 176 have similar constructions to these of the circuits illustrated in FIG. 14, except that the comparator 176 has a reference voltage corresponding to a rotational speed of 2000 rpm. A pressure sensor 178 is a well-known sensor for producing a voltage signal proportional to the intake pressure. The voltage signal from the sensor 178 is compared with a reference voltage corresponding to an intake pressure of −300 mmHg at a comparator 180. An AND gate 182 produces a logic sum signal with respect to the outputs of the comparators 176 and 180. Therefore, according to the circuits of FIG. 15, only when the rotational speed is equal to or lower than 2000 rpm and the intake pressure is equal to or lower than −300 mmHg, is a high level selection signal output.

(3) The operating condition may be discriminated depending upon the vehicle speed and the intake pressure. Namely, when the vehicle speed is equal to or slower than 45 mph and the intake pressure is equal to or lower than −300 mmHg, secondary air feedback control is carried out. The carburetor feedback control is carried out in other cases.

Figure 16:
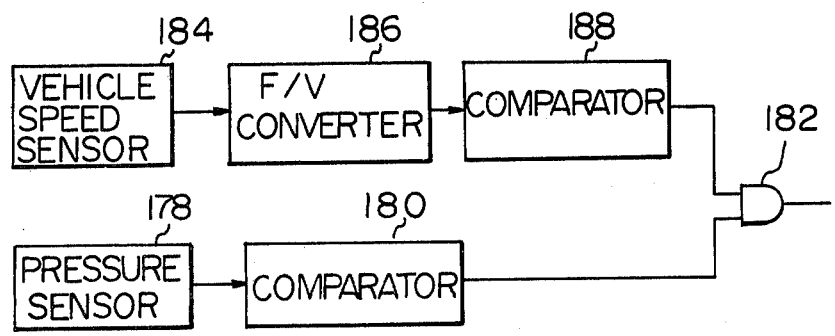

This discrimination of the engine's operating condition can be embodied by circuits illustrated in FIG. 16. The circuits of FIG. 16 have almost the same construction as the circuits of FIG. 15, except that a vehicle speed sensor 184, a F/V converter 186 and a comparator 188 are employed instead of the rotational speed sensor 172, F/V converter 174 and comparator 176. The vehicle speed sensor 184, F/V converter 186 and comparator 188 have the same construction as those in FIG. 13.

Figure 7:
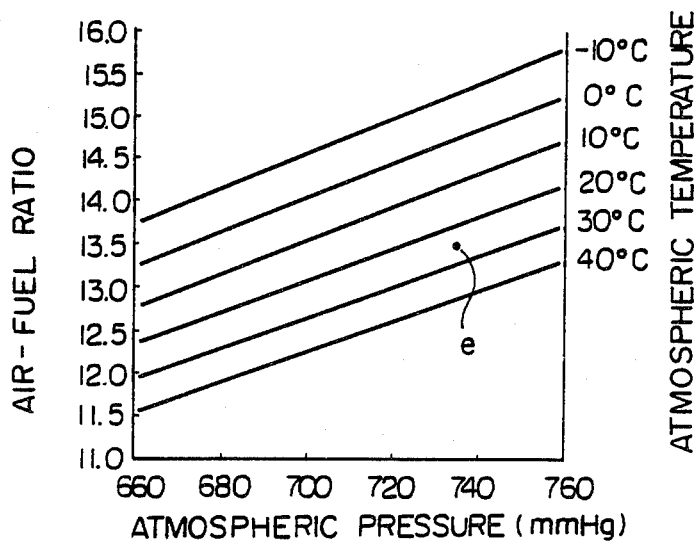
FIG. 7 illustrates air-fuel ratio characteristics with respect to the atmospheric pressure and the atmospheric temperature.
Figure 8:
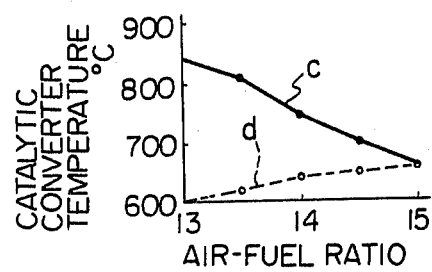
FIG. 8 illustrates temperature characteristics of the catalytic converter with respect to the air-fuel ratio of the mixture controlled by the carburetor.

(4) The operating condition may be discriminated depending upon the atmospheric pressure. Namely, when the atmospheric pressure is equal to or smaller than 720 mmHg, the carburetor feedback control is carried out, and when the atmospheric pressure is greater than 720 mmHg, both the carburetor feedback control and the secondary air feedback control are carried out. As will be understood from the air-fuel characteristics with respect to the atmospheric pressure illustrated in FIG. 7, the air density decreases with the decrease in the atmospheric pressure, and thus, the air-fuel ratio of the mixture gas set by the carburetor increases with the decrease in the atmospheric pressure. With the air-fuel ratio of the mixture gas being increased, the temperature of the catalytic converter rises when the secondary air feedback control is carried out. FIG. 8 illustrates this fact, in which the abscissa represents the air-fuel ratio set by the carburetor, the ordinate represents the temperature of the catalytic converter, symbol c represents characteristics when the secondary air feedback control is carried out, and symbol d represents characteristics when the secondary air feedback control is not carried out. Therefore, when the atmospheric pressure is equal to or smaller than 720 mmHg, the secondary air feedback control is discontinued, and only the carburetor feedback control is carried out to prevent the catalytic converter from being overheated.

Figure 17:

This discrimination of the engine's operating condition can be embodied by circuits illustrated in FIG. 17. According to the circuits of FIG. 17, a pressure sensor 190, which is well-known, produces a signal having a voltage corresponding to the atmospheric pressure, and a comparator 192 selectively produces a selection signal of the low or high voltage level depending upon whether the output signal of the sensor 190 exceeds a reference voltage that corresponds to the atmospheric pressure of 720 mmHg.

(5) The operating condition may be discriminated depending upon the atmospheric temperature. Namely, when the atmospheric temperature lies between a range of 15° C. to 35° C., the secondary air feedback control is carried out. The carburetor feedback control is carried out in other cases. This is because the secondary air feedback control makes it possible to realize the most preferable air-fuel ratio when the atmospheric temperature lies within a range of 15° C. to 35° C. FIG. 7 also illustrates relations between the atmospheric temperature and the air-fuel ratio of the mixture gas set by the carburetor. It is recommended that the secondary air feedback control be carried out so that the air-fuel ratio of the mixture gas does not deviate very much from a reference position e (a position of the air-fuel ratio of 13.5 under the atmospheric pressure of 735 mmHg and at the atmospheric temperature of 25° C.).

Figure 18:
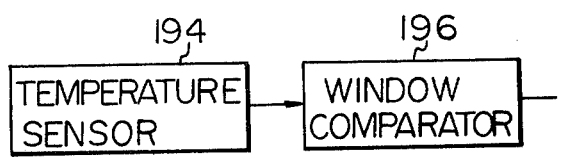

This discrimination of the engine's operating condition can be embodied by circuits illustrated in FIG. 18. According to the circuits of FIG. 18, a temperature sensor 194, which is well-known, produces a signal having a voltage corresponding to the atmospheric temperature, and a window comparator 196 selectively produces a selection signal of the low or high voltage level depending upon whether the voltage of the output signal from the sensor 194 lies within a predetermined range that corresponds to a range of 15° C. to 35° C.

Figure 19:
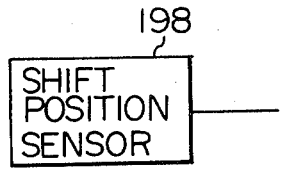

(6) The operating condition may be discriminated depending upon the position of the shift lever of a manual transmission. Namely, when the transmission is shifted into first (low), into second, or into third, so as to obtain a high power output of the engine, the secondary air feedback control is carried out, and the carburetor feedback control is carried out when the transmission is shifted into fourth or into fifth in which the catalytic converter tends to be overheated. A shift position sensor 198, as illustrated in FIG. 19, which produces signals corresponding to the shift position of the transmission is publicly known, and those skilled in the art will be able to very easily construct a discrimination circuit which discriminates the shift position relying upon the output signals of the sensor.

(7) The operating condition may be discriminated depending upon the venturi vacuum pressure of the carburetor. Namely, when the venturi vacuum pressure is equal to or higher than $-20$ mmHg (which corresponds to an intake pressure of about $-272$ mmHg), the secondary air feedback control is carried out. The carburetor feedback control is effected in other cases. The operating condition in which the venturi vacuum pressure is equal to or higher than $-20$ mmHg represents the case when the rotational speed of the engine is equal to or lower than 2500 rpm and the intake vacuum pressure is equal to or lower than $-300$ mmHg.

Figure 20:
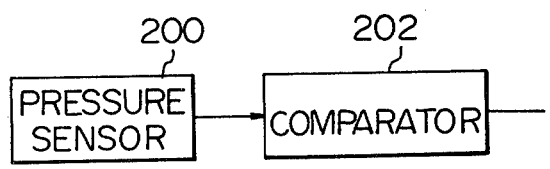

This discrimination of the engine's operating condition can be embodied by circuits illustrated in FIG. 20. According to the circuits of FIG. 20, a venturi pressure sensor 200 which is well-known produces a signal having a voltage corresponding to the venturi pressure, and a comparator 202 selectively produces a selection signal of the low or high voltage level depending upon whether the voltage of the signal from the sensor 200 exceeds a reference voltage that corresponds to the venturi pressure of $-20$ mmHg.

In addition to using the electromagnetic valve of the on-off control type and the air control valve of the type which actuates the diaphragm by pressure mentioned in the foregoing embodiment, the secondary air supply mechanism 22 can be constructed in a variety of other ways. For example, air control valves of the analog control type can be used as illustrated in FIGS. 9 and 10.

Figure 9:
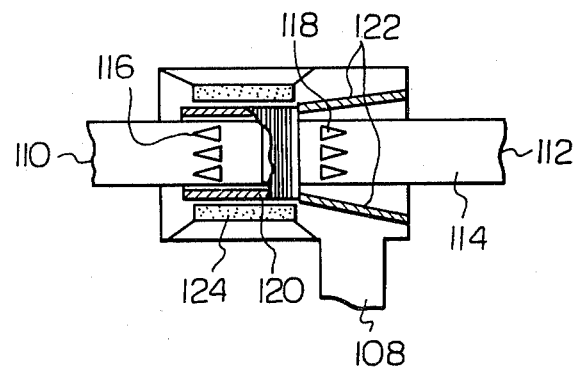
FIGS. 9 and 10 are schematic diagrams illustrating the structure of other examples of the air-control valve.

In FIG. 9, reference numeral 108 denotes a port communicated with an air pump which is not illustrated, 110 a port communicated with the secondary air injection manifold 20 illustrated in FIG. 1, and 112 a port which is open to the atmosphere. The port 108 is communicated with the ports 110 and 112 through ventilation holes 116 and 118 which are formed in the peripheral of a pipe 114, and the ventilation holes 116, 118 are opened and closed by a sleeve 120 which slides in the axial directions along the pipe 114. A coil is wound around the periphery of the sleeve 120. When an electric current is supplied via lead wires 122 which also serve as springs, the sleeve 120 is caused to move by a stroke corresponding to the magnitude of the electric current owing to the magnetic force established between the sleeve 120 and a permanent magnet 124. Therefore, the secondary air is fed from the port 108 to the port 110 in an amount corresponding to the magnitude of the electric current supplied through the lead wires 122.

Figure 10:
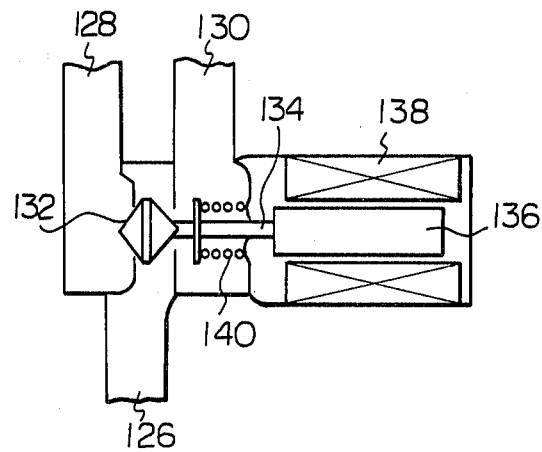

In FIG. 10, reference numeral 126 denotes a port communicated with an air pump which is not illustrated, 128 a port communicated with the secondary air injection manifold 20 illustrated in FIG. 1, and 130 a port which is open to the atmosphere. A valve 132 is connected to a moving core 136 via a connection rod 134, and moves in the axial directions of the connection rod 134 against the pushing force of a spring 140 in response to an electric current fed to an electromagnet 138. The valve 132 moves by an amount corresponding to the magnitude of the electric current supplied to the electromagnet 138, whereby the secondary air is allowed to flow from the port 126 to the port 128 by an amount corresponding to the magnitude of the electric current.

Figure 11:
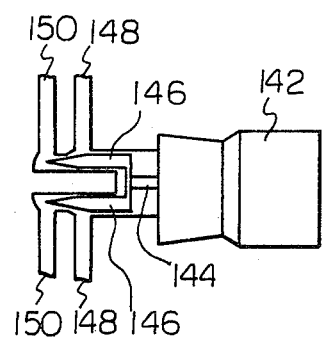
FIG. 11 is a schematic diagram illustrating the structure of another example of the actuator.

As mentioned above, the actuator 16 of the carburetor 14 can be constructed in a variety of other ways, in addition to the electromagnetic valve of the on-off control type. For instance, it may be a control valve of the type of a step motor as illustrated in FIG. 11, in which reference numeral 142 denotes a step motor which rotates by a predetermined angle in response to the applied pulse, 144 a connection rod which moves in the back and forth directions in response to the rotating amount of the step motor 142, 146 a valve connected to the connection rod, 148 a port for introducing the air, and 150 a port for discharging the air, which port 150 is communicated with the well 78 of FIG. 4. The valve 146 moves in response to the rotating amount of the step motor 142, so that the air fed from the port 148 to the port 150, i.e., the air bleeding amount varies in response to the rotating amount of the step motor 142.

Figure 12:
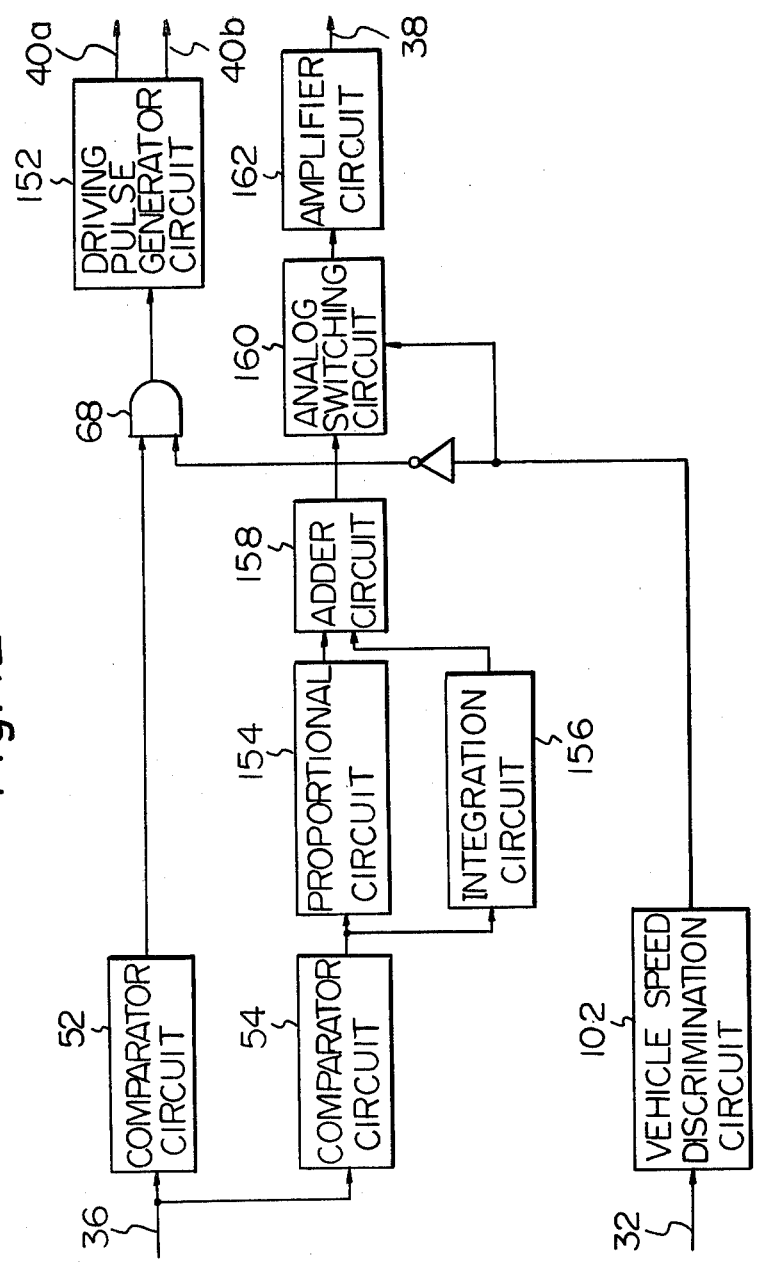
FIG. 12 is a block diagram of another embodiment of the control circuit illustrated in FIG. 1.

When the air control valve illustrated in FIG. 9 or 10 is employed as the secondary air supply mechanism 22 of FIG. 1, and the control valve illustrated in FIG. 11 is employed as the actuator 16, the construction of the control circuit 34, especially the construction of the driving signal generating circuit, will have to be slightly modified from that of FIG. 3. FIG. 12 is a block diagram illustrating the construction of the control circuit 34 which is designed to suit the above case. In FIG. 12, the members which are constructed in the same manner and which operate in the same manner as those of FIG.

3 are denoted by the same reference numerals. Referring to FIG. 12, when the AND gate 68 is open, the output of the comparator circuit 52 is fed to a driving pulse generator circuit 152. The driving pulse generator circuit 152 is a known one which is generally used for driving the step motor. When the signals are introduced, the driving pulse generator circuit 152 produces driving pulses maintaining a predetermined period, which are fed to the step motor of the actuator 16 via a line 40a. Further, depending upon whether the signals being applied are of the high level or the low level, the driving pulse generator circuit 152 sends a control signal which controls the rotating directions of the step motor via a line 40b. Therefore, the step motor 142 shown in FIG. 11 rotates in a direction to open the valve in response to the driving pulses when the air-fuel ratio is on the rich side, and rotates in a direction to close the valve when the air-fuel ratio is on the lean side. Therefore, the air bleeding amount is controlled, and the air-fuel ratio of the mixture gas supplied to the combustion chambers of the engine is brought into agreement with a stoichiometric air-fuel ratio.

On the other hand, the output of the comparator circuit 54 is fed to a proportional circuit 154 and to an integration circuit 156, and then the outputs of these circuits 154 and 156 are added by an adder circuit 158. The proportional circuit 154, integration circuit 156 and adder circuit 158 are constructed in the same manner and operate in the same manner as the proportional circuit 56, integration circuit 58 and adder circuit 60 illustrated in FIG. 3. When an analog switching circuit 160 is in a conductive state, the output of the adder circuit 158 is fed to an amplifier circuit 162 where it is converted into a current signal, and is sent to the secondary air supply mechanism through a line 38. Consequently, the air control valve is controlled in an analog manner, thereby to control the amount of the secondary air.

The AND gate 68 and the analog switching circuit 160 are opened and closed or are rendered conductive and nonconductive depending upon the selection signals sent from the vehicle speed discrimination circuit 102, in quite the same manner as the AND gates 68 and 84 of FIG. 3.

As will be apparent, according to the method of the present invention as illustrated in detail in the foregoing, the air-fuel ratio is controlled by supplying the secondary air to the exhaust system when the engine is under ordinary operating conditions, and the air-fuel ratio is controlled by controlling the mixture gas supplied to the combustion chambers when the engine is under such operating condition that the temperature of the catalytic converter exceeds a predetermined value. Therefore, the catalytic converter can be effectively prevented from being overheated, the operation performance can be heightened and the exhaust gas can be effectively purified.

As many widely different embodiments of the present invention may be constructed without departing from the spirit and scope of the present invention, it should be understood that the present invention is not limited to the specific embodiments described in this specification, except as defined in the appended claims.

We claim:

1. Method of purifying exhaust gas of an internal combustion engine having: an exhaust passage; combustion chambers; an air-fuel ratio sensor installed in the exhaust passage for detecting the concentration of a predetermined component contained in the exhaust gas and for deriving a first electrical signal; a catalytic converter installed in the exhaust passage for reducing noxious components contained in the exhaust gas; a first feedback control means for controlling an air-fuel ratio of the air-fuel mixture supplied into the combustion chambers, in accordance with said first electrical signal; and a second feedback control means for controlling the amount of secondary air supplied into the exhaust passage at a position located upstream of said air-fuel ratio sensor and said catalytic converter, in accordance with said first electrical signal, said method comprising the steps of:

detecting the rotational speed of the engine to generate a second electrical signal which indicates the detected rotational speed;

detecting the intake manifold pressure to generate a third electrical signal which indicates the detected pressure; energizing said first feedback control means and deenergizing said second feedback control means so as to execute the feedback control with respect to the air-fuel ratio only by the first feedback control means when said second and third electrical signals indicate the engine is under a first operating condition where at least one of the rotational speed and the intake manifold pressure is higher than a predetermined value; and energizing said second feedback control means and deenergizing said first feedback control means so as to execute the feedback control with respect to the air-fuel ratio only by the second feedback control means when said second and third electrical signals indicate the engine is under a second operating condition where both the rotational speed and the intake manifold pressure are lower than a predetermined value.

2. Method of purifying exhaust gas of an internal combustion engine having: an exhaust passage; combustion chambers; an air-fuel ratio sensor installed in the exhaust passage for detecting the concentration of a predetermined component contained in the exhaust gas and for deriving a first electrical signal; a catalytic converter installed in the exhaust passage for reducing noxious components contained in the exhaust gas; a first feedback control means for controlling an air-fuel ratio of the air-fuel mixture supplied into the combustion chambers, in accordance with said first electrical signal; and a second feedback control means for controlling the amount of secondary air supplied into the exhaust passage at a position located upstream of said air-fuel ratio sensor and said catalytic converter, in accordance with said first electrical signal, said method comprising the steps of:

detecting the rotational speed of the engine to generate a second electrical signal which indicates the detected rotational speed;

detecting the intake manifold pressure to generate a third electrical signal which indicates the detected pressure; energizing said first feedback control means and deenergizing said second feedback control means so as to execute the feedback control with respect to the air-fuel ratio only by the first feedback control means when said second and third electrical signals indicate the engine is under a first operating condition where at least one of the rotational speed and the intake manifold pressure is higher than a predetermined value; and energizing said second feedback control means and said first feedback control means when said second and third electrical signals indicate the engine is under a second operating condition where both the rotational speed and the intake manifold pressure are lower than a predetermined value.

* * * * *